United States Patent
Kohzaki et al.

(10) Patent No.: US 7,025,907 B2
(45) Date of Patent: Apr. 11, 2006

(54) CARBON-CONTAINING LITHIUM-IRON COMPOSITE PHOSPHORUS OXIDE FOR LITHIUM SECONDARY BATTERY POSITIVE ELECTRODE ACTIVE MATERIAL AND PROCESS FOR PRODUCING THE SAME

(75) Inventors: Masao Kohzaki, Aichi (JP); Youji Takeuchi, Aichi (JP); Yoshio Ukyo, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 389 days.

(21) Appl. No.: 10/143,946

(22) Filed: May 14, 2002

(65) Prior Publication Data
US 2002/0182497 A1    Dec. 5, 2002

(30) Foreign Application Priority Data
May 15, 2001    (JP)    .............................. 2001-145396

(51) Int. Cl.
*H01B 1/00*    (2006.01)
*H01M 4/06*    (2006.01)
*H01M 4/08*    (2006.01)
*H01M 4/58*    (2006.01)

(52) U.S. Cl. .................. 252/518.1; 252/502; 252/519; 252/521; 423/306; 423/593; 423/594; 429/221; 429/218.1

(58) Field of Classification Search ............. 252/518.1, 252/519, 521, 502; 423/306, 593, 594; 429/221, 429/218.1

See application file for complete search history.

(56) References Cited

U.S. PATENT DOCUMENTS 5,910,382 A  *  6/1999  Goodenough et al. ... 429/218.1

(Continued)

FOREIGN PATENT DOCUMENTS

| JP | 9-134725 | | 5/1997 |
|---|---|---|---|
| JP | 11-25983 | | 1/1999 |
| JP | 11-025983 A | * | 1/1999 |
| JP | 2000-294238 | * | 10/2000 |
| JP | 2001-110414 | * | 4/2001 |

OTHER PUBLICATIONS

Huasng et al, "Approaching Theoretical Capacity of LiFePO4 at Room Temperature at High Rates," Electrochemical and Solid0State Letters, 2001,4(10), A170-A172.*

(Continued)

*Primary Examiner*—Mark Kopec
*Assistant Examiner*—Kallambella Vijayakumar
(74) *Attorney, Agent, or Firm*—Oblon, Spivak, McClelland, Maier & Neustadt, P.C.

(57) ABSTRACT

A carbon-containing lithium-iron composite phosphorus oxide for a lithium secondary battery positive electrode active material, includes particles being composed of a lithium-iron composite phosphorus oxide having an olivine structure whose basic composition is $LiFePO_4$, and being composited with carbonaceous fine particles. A process for producing the same includes the steps of mixing a lithium compound making a lithium source, an iron compound making an iron source, a phosphorus-containing ammonium salt making a phosphorus source and carbonaceous fine particles, thereby preparing a mixture, and calcicing the mixture at a temperature of from 600° C. or more to 750° C. or less.

12 Claims, 2 Drawing Sheets

U.S. PATENT DOCUMENTS 6,153,333 A * 11/2000 Barker ............... 429/218.1
6,528,033 B1 * 3/2003 Barker et al. ............... 423/306
2002/0106563 A1 * 8/2002 Okawa et al. ............... 429/221
2003/0190526 A1 * 10/2003 Saidi et al. ............... 429/231.9

OTHER PUBLICATIONS

Huang et al, "Approaching Theoretical Capacity of LiFePO4 at Room Temperature at High Rates," Electrochemical and Solid-State Letters, 2001, 4(10), A170-A172.*

Weth et al, "The Structure of Carbon Blacks Measured with (Ultra) Small Angle X-ray Scattering," J. Porous Matl. 2001, 8(4), pp 319-325, Abstract.*

A. Yamada, et al. "Optimized $LiFePO_4$ for Lithium Battery Cathodes" Journal of the Electrochemical Society, 148 (3), 2001, pp. A224-A229.

H. Huang, et al. "Approaching Theoretical Capacity of $LiFePO_4$ at Room Temperature at High Rates" Electrochemical and Solid-State Letters, 4 (10), 2001, pp. A170-A172.

A. K. Padhi, et al. "Phospho-Olivines as Positive-Electrode Materials for Rechargeable Lithium Batteries" J. Electrochem. Soc., vol. 144, No. 4, Apr. 1997, pp. 1188-1194.

* cited by examiner

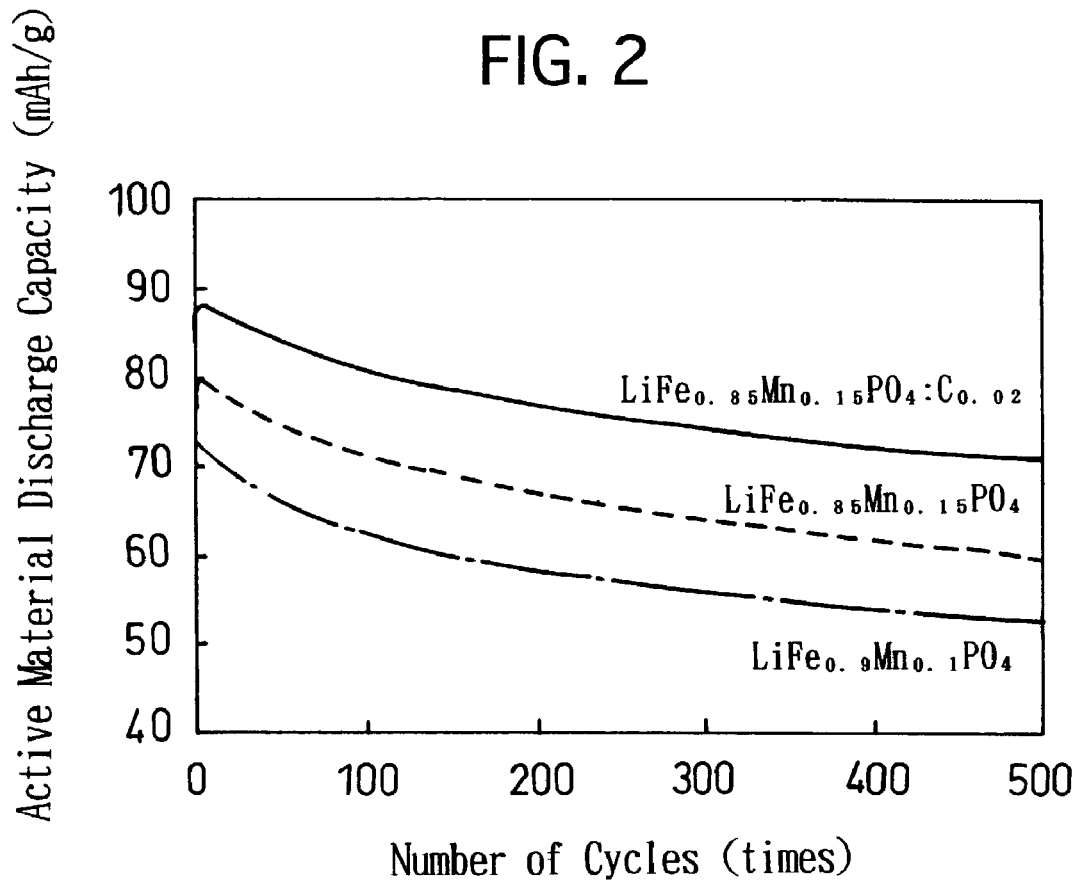

CARBON-CONTAINING LITHIUM-IRON COMPOSITE PHOSPHORUS OXIDE FOR LITHIUM SECONDARY BATTERY POSITIVE ELECTRODE ACTIVE MATERIAL AND PROCESS FOR PRODUCING THE SAME

BACKGROUND OF THE INVENTION

1. Field of the Invention

The present invention relates to a carbon-containing lithium-iron composite phosphorus oxide for a positive electrode active material, which can constitute lithium secondary batteries in which the dope-undope phenomenon of lithium is utilized, and moreover to a process for producing the same.

2. Description of the Related Art

As personal computers, video cameras, cellular phones, and the like, have been downsized, lithium secondary batteries have been put to practical use. In the fields of information-related appliances and communication appliances, the lithium secondary batteries have been spread widely as a power source, which is employed for the appliances, due to the reason that they exhibit high energy densities. While, in the field of automobiles as well, it has been urged to develop electric automobiles because of the environmental problems as well as the resource problems. As a power source for electric automobiles as well, lithium secondary batteries have been investigated.

At present, as positive electrode active materials of lithium secondary batteries, which can constitute 4V-class secondary batteries, lithium-transition metal composite oxides, such as $LiCoO_2$, $LiNiO_2$ and $LiMn_2O_4$, have been used preferably. Especially, not only since $LiCoO_2$ can be readily synthesized and can be handled with relative readiness, but also since it is good in terms of the charge-and-discharge characteristic, lithium secondary batteries, which use $LiCoO_2$ as the positive electrode active material, are one of the main streams.

However, cobalt, and so on, are less in view of the resource amount. Accordingly, the lithium secondary batteries, which use $LiCoO_2$, etc., as the positive electrode active material, are less likely to cope with the future mass-producing and upsizing that aim at batteries for electric automobiles. Moreover, such lithium secondary batteries should inevitably be expensive extremely in view of the cost. Hence, trials have been made in which lithium-iron composite oxides, which contain iron as a constituent element, are used instead of cobalt, etc., because iron is abundant as the resource and because it is less expensive.

As one of the trials, Japanese Unexamined Patent Publication (KOKAI) No. 9-134,725, for instance, discloses lithium secondary batteries in which $LiFePO_4$, $LiFeVO_4$, and the like, having an olivine structure, are used as the positive electrode active material.

However, according to the re-tests which were carried out by the inventors of the present invention, it was not possible to obtain a sufficient capacity by the lithium secondary batteries, which used the lithium-iron composite oxides, having an olivine structure as set forth in the above-described publication, as the positive electrode active material. Namely, it is believed that 90 mAh/g or more is required as an active electrode discharge capacity when lithium secondary batteries are charged and discharged at a practical charge-and-discharge density. However, when the aforementioned lithium-iron composite oxides were used as the positive electrode active material, it was difficult to obtain such an active material discharge capacity. Moreover, it was found out that the lithium secondary batteries, which used the aforementioned $LiFePO_4$, etc., as the positive electrode active material, exhibited the lowering active material discharge capacity when they were charged and discharged repeatedly, namely, they suffered greatly from the so-called cycle deterioration.

SUMMARY OF THE INVENTION

The present invention has been developed in view of the aforementioned circumstances. It is therefore an object of the present invention to provide a lithium-iron composite phosphorus oxide for a lithium secondary battery positive electrode active material whose discharge capacity is large per an active material, and which can constitute a lithium secondary battery being capable of maintaining its capacity even when it is charged and discharged repeatedly, namely being favorable in terms of the so-called cycle characteristic.

According to the present invention, a carbon-containing lithium-iron composite phosphorus oxide for a lithium secondary battery positive electrode active material, comprises particles being composed of a lithium-iron composite phosphorus oxide having an olivine structure whose basic composition is $LiFePO_4$, and being composited with carbonaceous fine particles.

A lithium-iron composite phosphorus oxide makes the base of the carbon-containing lithium-iron composite phosphorus oxide according to the present invention. Its crystalline structure makes an orthorhombic system olivine structure. Its space group is expressed by Pmnb. The olivine structure is a structure which is based on the hexagonal close-packed structure of oxygen, in which phosphorus atoms are positioned at the tetrahedron sites, and in which both of lithium atoms and iron atoms are positioned at the octahedron sites. When the carbonaceous fine particles are taken into the particles of the lithium-iron composite phosphorus oxide, the lithium-iron composite phosphorus oxide and the carbonaceous fine particles are composited. The phrase, "being composited," means a state in which the carbonaceous fine particles are dispersed in the particles of the lithium-iron composite phosphorus oxide. Since the carbonaceous fine particles, which are on the order of nanometer, are dispersed in the particles of the lithium-iron composite phosphorus oxide, it is possible to realize the so-called nano-compositing of the lithium-iron composite phosphorus oxide with the carbonaceous fine particles. Thus, since the carbonaceous fine particles are composited with the particles of the lithium-iron composite phosphorus oxide, much more conductive paths are formed so that the internal resistance decreases.

Moreover, although the following will be described later in detail, the compositing of the carbonaceous fine particles is carried out by adding the carbonaceous fine particles to a raw material mixture in the synthesis of the lithium-iron composite phosphorus oxide. By thus adding the carbonaceous fine particles, it is possible to sustain a reducing atmosphere during the synthesis of the lithium-iron composite phosphorus oxide. Accordingly, it is possible to suppress the oxidation of $Fe^{2+}$ to $Fe^{3+}$ and furthermore to inhibit the grain growth and sintering of the lithium-iron composite phosphorus oxide.

For example, when a lithium-iron composite phosphorus oxide whose basic composition is $LiFePO_4$ is used as a positive electrode material of a lithium secondary battery, it is essential to oxidize $Fe^{2+}$ to $Fe^{3+}$ in the charging of the resultant lithium secondary battery. Therefore, the suppression of the oxidation of $Fe^{2+}$ in the synthesis of the lithium-iron composite phosphorus oxide results in the capacity enlargement of the resulting lithium secondary battery. Moreover, since the grain growth and sintering of the lithium-iron composite phosphorus oxide are inhibited, the particle diameters of the thus synthesized carbon-containing lithium-iron composite phosphorus oxide particles become small relatively. As a result, the diffusion distance of lithium ions is shortened so that the dope and undope reactions of lithium ions are activated. Hence, it is possible to augment the capacity of the resultant lithium secondary battery.

Therefore, the present carbon-containing lithium-iron composite phosphorus oxide can make a positive electrode active material whose discharge capacity is large per an active material, and which can constitute a lithium secondary battery being capable of maintaining its capacity even when it is charged and discharged repeatedly, namely being favorable in terms of the so-called cycle characteristic.

Moreover, in the present invention, it is not limited in particular on how to produce the present carbon-containing lithium-iron composite phosphorus oxide. However, by a production process according to the present invention, it is possible to produce the present carbon-containing lithium-iron composite phosphorus oxide more readily. For instance, a process according to the present invention for producing a carbon-containing lithium-iron composite phosphorus oxide comprises the steps of: mixing a lithium compound making a lithium source, an iron compound making an iron source, a phosphorus-containing ammonium salt making a phosphorus source and carbonaceous fine particles, thereby preparing a mixture; and calcicing the mixture at a temperature of from 600° C. or more to 750° C. or less.

Since the carbonaceous fine particles are mixed and sintered together with the respective raw materials, the carbonaceous fine particles are taken in deep inside the lithium-iron composite phosphorus oxide, and are dispersed substantially uniformly therein. Moreover, it is possible to produce the present carbon-containing lithium-iron composite phosphorus oxide by such an extremely simple and easy process that the respective raw materials are mixed and sintered. Therefore, the present process according to the present invention for producing a carbon-containing lithium-iron composite phosphorus oxide makes it possible to readily produce a carbon-containing lithium-iron composite phosphorus oxide, which not only exhibits the aforementioned active material capacity but also is less likely to suffer from the cycle deterioration.

The carbon-containing lithium-iron composite phosphorus oxide according to the present invention comprises the particles of the lithium-iron composite phosphorus oxide, having an olivine structure, which are composited with the carbonaceous fine particles. When the present carbon-containing lithium-iron composite phosphorus oxide is used to constitute a lithium secondary battery, it is possible to make a lithium secondary battery which not only exhibits a large active material capacity but also is good in terms of the cycle characteristic that the capacity is less likely to lower even after it is subjected to a charge-and-discharge cycle repeatedly. Moreover, by the process according to the present invention for producing a carbon-containing lithium-iron composite phosphorus oxide, it is possible to readily produce a carbon-containing lithium-iron composite phosphorus oxide, which not only exhibits the aforementioned large active material capacity but also is less likely to suffer from the cycle deterioration.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 2 illustrates the variations of the active material discharge capacity, being exhibited by lithium secondary batteries, in a charge-and-discharge cycle test.

DETAILED DESCRIPTION OF THE PREFERRED EMBODIMENTS

Figure 1:
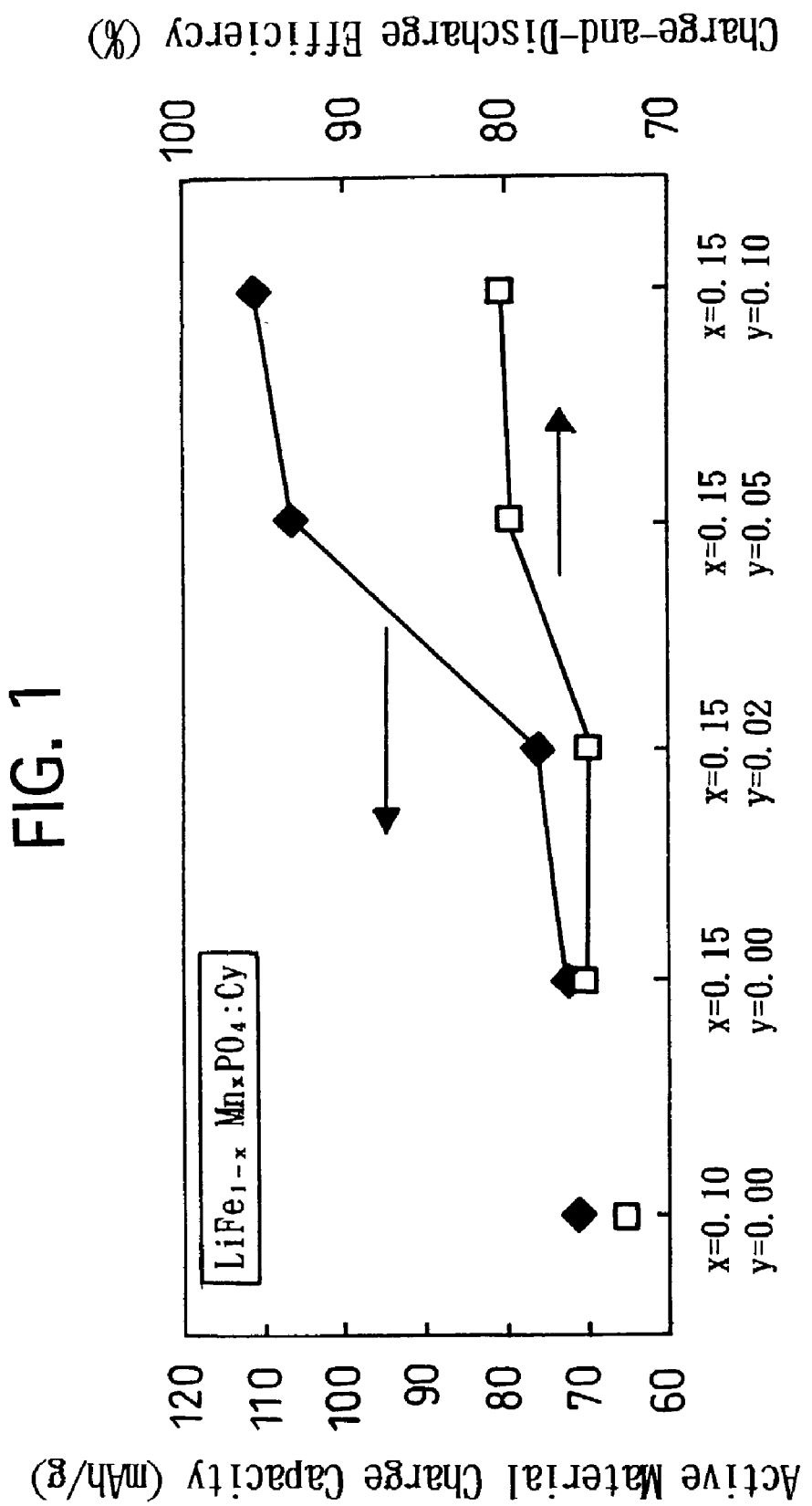
FIG. 1 illustrates the values of the active material charge capacities and charge-and-discharge efficiencies, being exhibited by lithium secondary batteries which used carbon-containing lithium-iron composite phosphorus oxides having different proportions of carbon contents.

Having generally described the present invention, a further understanding can be obtained by reference to the specific preferred embodiments which are provided herein for the purpose of illustration only and not intended to limit the scope of the appended claims.

Hereinafter, the carbon-containing lithium-iron composite phosphorus oxide according to the present invention and the process according to the present invention for producing the same will be described in detail with reference to modes for embodying them. Moreover, a lithium secondary battery, one of their applicable modes, will be described as well.

Carbon-Containing Lithium-Iron Composite Phosphorus Oxide

The present carbon-containing lithium-iron composite phosphorus oxide for a lithium secondary battery positive electrode active material comprises particles being composed of a lithium-iron composite phosphorus oxide having an olivine structure whose basic composition is $LiFePO_4$, and being composited with carbonaceous fine particles.

The phrase, "basic composition is $LiFePO_4$," does not necessarily imply lithium-iron composite phosphorus oxides, which have compositions expressed by the composition formula, only. In addition, it implies, for example, lithium-iron composite phosphorus oxides, in which the other element, such as Co, Ni, Mn, Mg, Cu, Zn, Ge, etc., substitutes for a part of Fe sites in their crystalline structures. Moreover, the phrase implies not only lithium-iron composite phosphorus oxides, which have stoichiometric compositions, but also lithium-iron composite phosphorus oxides, in which a part of the constituent elements is omitted, or the like, to make non-stoichiometric compositions.

For instance, Mn, Mg, Ni, Co, Cu, Zn and Ge exhibit ionic radii which are substantially equal to the ionic radius of Fe, and are oxidized and reduced at different electric potentials from the oxidation-and-reduction electric potential of Fe. Hence, when at least one element of these elements substitutes for a part of the Fe sites, it is possible to stabilize the crystalline structures of the resulting lithium-iron composite phosphorus oxides. Therefore, the lithium-iron composite phosphorus oxide can be desirably be lithium-iron composite phosphorus oxides in which the other element "M" substitutes for a part of the Fe sites, specifically, can be those expressed by a composition formula, $LiFe_{1-x}M_xPO_4$, wherein "M" is at least one element selected from the group consisting of Mn, Mg, Ni, Co, Cu, Zn and Ge and a substitution proportion "x" is 0.02≦"x"≦0.2. In particular, due to the reasons that Mn is abundant as the resource and is less expensive, the substitution element "M" can desirably be Mn.

When at least one element, being selected from group consisting of Mn, Mg, Ni, Co, Cu, Zn and Ge, substitutes for a part of the Fe sites, a substitution proportion, i.e., the value "x" in the aforementioned compositional formula, can desirably be 0.02≦"x"≦0.2. The reasons are as follows. When the value "x" is less than 0.02, the substitution effect is exhibited less so that it is not possible to fully stabilize the crystalline structure. Moreover, when the value "x" exceeds 0.2, the substitution proportion is so large that it is not possible to make a lithium secondary battery which fully exhibits an initial discharge capacity. In addition, considering making a lithium secondary battery which not only has a large capacity but also exhibits a favorable cycle characteristic, it is furthermore desired that the range can be 0.05≦"x"≦0.15.

Still further, as described above, the lithium-iron composite phosphorus oxide, which makes the base of the carbon-containing lithium-iron composite phosphorus oxide according to the present invention, is arranged so that its crystalline structure makes an orthorhombic system olivine structure. Moreover, its space group is expressed by Pmnb. Namely, it has a structure which is based on the hexagonal close-packed structure of oxygen, in which phosphorus atoms are positioned at the tetrahedron sites, and in which both of lithium atoms and iron atoms are positioned at the octahedron sites.

The carbonaceous fine particles, which are composited with the above-described lithium-iron composite phosphorus oxide, are not limited in particular regarding the types of the carbonaceous substances. For instance, it is possible to name carbonaceous substances, such as graphitic materials, easily-graphitized carbon, difficultly-graphitized carbon, and the like. The graphitic material can be natural graphite, nodular or fibrous artificial graphite, etc. The easily-graphitized carbon can be coke, etc. The difficultly-graphitized carbon can be calcined phenolic resin, etc. It is possible to independently use the fine particles of one of these carbonaceous substances, or to mix two or more of them to use. Among them, when it is necessary to take the dispersibility in the lithium-iron composite phosphorus oxide and the conductivity improvement effect into consideration, it is desirable to use carbon black. If such is the case, a hydrocarbonaceous gas can be turned into the fine particles by burning.

The average particle diameter of the carbonaceous fine particles is not limited in particular. However, in view of compositing them with the particles of the lithium-iron composite phosphorus oxide, it is desired that the average particle diameter can fall in a range of from 5 nm or more to 100 nm or less. The reasons are as follows. When the average particle diameter is less than 5 nm, the reactivity lowers in the synthesis of the carbon-containing lithium-iron composite phosphorus oxide, compared with the case where the carbonaceous fine particles have the average particle diameter falling in the aforementioned range. Moreover, when the average particle diameter exceeds 100 nm, such carbonaceous fine particles exhibit lower dispersibility and produce the conductivity improvement effect less, compared with the carbonaceous fine particles which have the average particle diameter falling in the aforementioned range.

Moreover, the molar ratio of the carbon atoms in the carbonaceous fine particles with respect to the lithium atoms, i.e., the molar ratio of the carbon atoms, being involved in the present carbon-containing lithium-iron composite phosphorus oxide, with respect to the lithium atoms, being involved in the present carbon-containing lithium-iron composite phosphorus oxide, can desirably fall in a range of from 0.02 or more to 0.2 or less. The reasons are as follows. When the molar ratio is less than 0.02, the effects, resulting from the compositing of the carbonaceous fine particles, are produced less, compared with the case where the molar ratio falls in the aforementioned range. When the molar ratio exceeds 0.2, the reactivity lowers in the synthesis of the carbon-containing lithium-iron composite phosphorus oxide, compared with the case where the molar ratio falls in the aforementioned range. In addition, if such is the case, the resultant carbon-containing lithium-iron composite phosphorus oxide comes to exhibit a lower active material discharge capacity.

The average particle diameter of the present carbon-containing lithium-iron composite phosphorus oxide is not limited in particular. Especially, in view of taking carrying out the dope and undope reactions of lithium ions smoothly and producing an ample active material discharge capacity when a lithium secondary battery is charged and discharged at a practical charge-and-discharge density into consideration, the average particle diameter can desirably be 5 μm or less. Moreover, from a standpoint of manufacturing an electrode with ease, the average particle diameter can desirably be 0.2 μm or more.

Note that the average particle diameter of the particles of the present carbon-containing lithium-iron composite phosphorus oxide is an average value of the particle diameter of the respective particles. For example, it is possible to measure the respective particle diameters by utilizing a scanning electron microscope (SEM). Specifically, the measurement can be carried out in the following manner. The maximum and minimum diameters of the respective particles of the present carbon-containing lithium-iron composite phosphorus oxide are measured by using a scanning electron microscope (SEM). The average value of these two values can be employed as the particle diameter of one of the particles.

Process for Producing Carbon-Containing Lithium-Iron Composite Phosphorus Oxide

In the present invention, a production process for the present carbon-containing lithium-iron composite phosphorus oxide is not limited in particular. However, by the production process according to the present invention, it is possible to more readily produce the present carbon-containing lithium-iron composite phosphorus oxide. The present production process comprises the step of preparing a mixture by mixing raw materials, and the step of calcining the mixture at a predetermined temperature.

(1) Raw Material Mixture Preparation Step

In the raw material mixture preparation step of the present production process, a lithium compound, an iron compound, a phosphorus-containing ammonium salt and carbonaceous fine particles are mixed, thereby preparing a mixture.

As for the lithium compound making a lithium source, it is possible to use $Li_2CO_3$, $Li(OH)$, $Li(OH) \cdot H_2O$, $LiNO_3$, and the like. In particular, it is desirable to use $Li_2CO_3$ due the reason that it exhibits low hygroscopicity.

The iron compound making an iron source can be a compound in which the valence number of Fe is divalent. As for such an iron compound, it is possible to use $FeC_2O_4 \cdot 2H_2O$, $FeCl_2$, and so on. In particular, it is desirable to use $FeC_2O_4 \cdot 2H_2O$ due to the reason that the gas, which generates in the calcination, exhibits low corrosiveness.

As for the phosphorus-containing ammonium salt making a phosphorus source, it is possible to use $NH_4H_2PO_4$, $(NH_4)_2HPO_4$, and the like. In particular, it is desirable to use $NH_4H_2PO_4$ due to the reasons that it exhibits low hygroscopicity and generates the corrosive gas in a lesser amount.

Note that, due to the reason that no ammonia generates, it is possible to use a compound, which is free from an ammonium salt, to make a lithium source as well as a phosphorus source. If such is the case, instead of the lithium compound as well as the phosphorus-containing ammonium salt, it is possible to use a compound, such as $LiH_2PO_4$, etc., in which Li and P are included in a ratio, Li:P=1:1, by mol.

As for the carbonaceous fine particles, it is possible to use the fine particles, which are formed of the above-described carbonaceous substances. In particular, when it is necessary to take the dispersibility in the lithium-iron composite phosphorus oxide and the conductivity improvement effect into consideration, it is desirable to use carbon black. Note that, when the other elements, such as Co, Ni, Mn, Mg, Cu, Zn, Ge, and so on, substitute for a part of the Fe sites, it is possible to mix compounds, which contain the substitution elements, in the same manner as the above-described compounds. As for the compounds which contain the substitution elements, it is possible to use $MnCO_3$, MgO, NiO, CoO, CuO, and the like.

It is possible to use all of the aforementioned raw materials in a powdery form. It is possible to mix them by the methods which are usually used in mixing powders. Specifically, it is possible, for example, to mix them with a ball mill, a mixer, a mortar, and so on. Note that the mixing proportions of the respective raw materials are determined so as to conform to the compositions of the carbon-containing lithium-iron composite phosphorus oxides to be produced.

(2) Calcination Step

In the calcination step, the mixture, which has been prepared in the raw material mixture preparation step, is calcined at a temperature of from 600° C. or more to 750° C. or less. In order to inhibit Fe from being oxidized to trivalent, the calcination can be carried out in an inert atmosphere or in a reducing atmosphere. Specifically, the calcination can be carried in an argon gas flow, a nitrogen gas flow, and the like.

The calcination temperature is adapted to fall in the range of from 600° C. or more to 750° C. or less. The reasons are as follows. When the calcination temperature is less than 600° C., the reaction does not proceed sufficiently so that sub-phases, which are formed of other than the objective orthorhombic crystals, are generated. Thus, the crystallinity of the resulting lithium-iron composite phosphorus oxide degrades. On the contrary, when the calcination temperature exceeds 750° C., the particles of the resultant lithium-iron composite phosphorus oxide grows to large particle diameters. In particular, taking improving the input-and-output characteristic of lithium secondary batteries and securing a high capacity therefor into consideration, it is desired that the calcination temperature can be adapted to fall in a range of from 620° C. or more to 700° C. or less. Note that the calcination time can be adapted to such a time for completing the calcination. For instance, the calcination can be usually carried out for 6 hours approximately.

Lithium Secondary Battery

A mode for embodying a lithium secondary battery, one of the applicable modes of the carbon-containing lithium-iron composite phosphorus oxide according to the present, will be hereinafter described. In general, a lithium secondary battery comprises a positive electrode, a negative electrode, a separator, and an non-aqueous electrolyte solution. The positive and negative electrodes dope and undope lithium ions. The separator is held between the positive electrode and the negative electrode. The non-aqueous electrolyte solution transfers the lithium ion between the positive electrode and the negative electrode. The secondary lithium battery of the present embodiment can follow such an arrangement. On the respective constituent members, the descriptions will be hereinafter presented.

The positive electrode is formed in the following manner. A conductor and a binder are mixed with a positive electrode material which can dope and undope lithium ions. If necessary, a proper solvent is added thereto to make a pasty positive electrode mixture. The resultant mixture is coated and dried on a surface of a collector. The collector can be a metallic foil which is made of aluminum, etc. Thereafter, the coated mixture is pressed to heighten the active material density.

In the present embodiment, the above-described carbon-containing lithium-iron composite phosphorus oxide is used as the positive electrode material. Note that there are a variety of the present carbon-containing lithium-iron composite phosphorus oxides depending on the compositions and particle diameters as well as on the types of the carbonaceous fine particles. Therefore, it is possible to use one of them only as the positive electrode active material. Moreover, it is possible to use two or more of them as the positive electrode active material. In addition, it is possible to employ an arrangement in which one of the present carbon-containing lithium-iron composite phosphorus oxides are mixed with one of the conventional positive electrode active materials, which have been known already, to make the positive electrode active material.

The conductor used in the positive electrode is a constituent member for securely giving electric conductivity to the resultant positive electrode active material layer. It is possible to use one of carbonaceous powdery materials, or to mix two or more of them to use. The carbonaceous powdery material can be carbon black, acetylene black, graphite, and the like. The binder is a constituent member for keeping the active material particles together. It is possible to use fluorine-containing resins, thermoplastic resins, and so on, as the binder. The fluorine-containing resin can be polytetrafluoroethylene, polyvinylidene fluoride, fluoroelastomer, etc. The thermoplastic resin can be polypropylene, polyethylene, etc. As for a solvent for dispersing the positive electrode active material, the conductor and the binder, it is possible to use organic solvents, and the like. The organic solvent can be N-methyl-2-pyrrolidone, etc.

It is possible to form a negative electrode, which faces the positive electrode, in the following manner. Metallic lithium, lithium alloys, and so on, are formed as a sheet to make a negative electrode. Alternatively, metallic lithium, lithium alloys, and so on, are formed as a sheet, and the resultant sheet is then pressed onto a collector net to make a negative electrode. The collector net can be made of nickel, stainless steel, and the like. However, when the precipitation of dendrite is taken into consideration so as to make a lithium secondary battery of superb safety, it is desirable to make the negative electrode by using carbonaceous substances, which can dope and undope lithium ions. As for usable carbonaceous substances, it is possible to name graphite, sintered organic compounds, powdery substances, and so on. The graphite can be natural or artificial graphite, etc. The sintered organic substance can be sintered phenolic resins, etc. The powdery substance can be coke, etc. In this instance, a binder is mixed with a negative electrode active material. A proper solvent is added thereto to make a pasty negative electrode active mixture. The resultant mixture is coated and dried on a surface of a collector. The collector can be a metallic foil which is made of copper, etc. Note that, when the carbonaceous substances are used to make the negative electrode active material, similarly to the positive electrode, it is possible to use fluorine-containing resins as a binder for the negative electrode and to use organic solvents as a solvent. The fluorine-containing resin can be polyvinylidene fluoride, etc. The organic solvent can be N-methyl-2-pyrrolidone, etc.

The separator, which is held between the positive electrode and the negative electrode, holds the electrolyte solution while isolating the positive electrode and the negative electrode, and passes ions. As for the separator, it is possible to use thin fine-porous films. The thin fine-porous film can be made from polyethylene, polypropylene, etc.

The non-aqueous electrolyte solution is made by dissolving an electrolyte in an organic solvent. As for the organic solvent, it is possible to use one of non-protonic organic solvents or a mixture solution of two or more of them. The non-protonic organic solvent can be, for example, ethylene carbonate, propylene carbonate, dimethyl carbonate, diethyl carbonate, γ-butyrolactone, acetonitrile, dimethoxyethane, tetrahydrofuran, dioxolane, methylene chloride, etc. Moreover, it possible to use lithium salts, which generate lithium ions by dissolving, as the electrolyte to be solved in the organic solvent. The lithium salt can be LiI, $LiClO_4$, $LiAsF_6$, $LiBF_4$, $LiPF_6$, etc.

Note that, instead of the above-described arrangement which comprises the separator and the non-aqueous electrolyte solution, it is possible to use polymer solid electrolytes, which use polymers having a high molecular weight, and lithium salts. The polymer can be polyethylene oxide, etc. The lithium salt can be $LiClO_4$, $LiN(CF_3SO_2)_2$, etc. Moreover, it is possible to use gel electrolytes in which the aforementioned non-aqueous electrolyte solutions are trapped in solid polymer matrices. The solid polymer matrices can be formed of polyacrylonitrile, etc.

It is possible to form the lithium secondary battery, which comprises the aforementioned constituent members, as a variety of shapes, for instance, coin shapes, laminated shapes, cylinder shapes, and the like. Even if any one of the shapes is employed, it is possible to complete a lithium secondary battery in the following manner. The separator is held between the positive electrode and the negative electrode to make an electrode assembly. The positive electrode and the negative electrode are connected with a positive electrode terminal and a negative electrode terminal, which lead to the outside, respectively, so as to conduct the intervals therebetween. Then, the electrode assembly is enclosed together with the non-aqueous electrolyte solution in a battery case.

Possibilities of the Other Embodiments

The carbon-containing lithium-iron composite phosphorus oxide according to the present invention and the process for producing the same have been described so far with reference to the embodiment mode. Note that, however, the above-described embodiment mode is one of the specific embodiments. Not to mention the aforementioned embodiment mode, it is possible to carry out the present carbon-containing lithium-iron composite phosphorus oxide and the production process for the same in such modes that they are subjected to a diversity of modifications and improvements based on the knowledge of a person having ordinary skill in the art.

EXAMPLES

In accordance with the above-described embodiment mode, a variety of the carbon-containing lithium-iron composite phosphorus oxides were produced in which the proportion of the contents of the carbon atoms were different with each other. Then, lithium secondary batteries were manufactured in which a diversity of the thus produced carbon-containing lithium-iron composite phosphorus oxides were used as the positive electrode active materials. The resultant lithium secondary batteries were graded for the battery characteristics by measuring the active material charge-and-discharge capacity. Note that the "active material charge-and-discharge capacity" herein implies the charge-and-discharge capacity exhibited by a unit weight of the positive electrode active materials from which the weight of the carbonaceous fine particles is subtracted. Hereinafter, the specific examples will be described in detail.

Production of Carbon-Containing Lithium-Iron Composite Phosphorus Oxides

A variety of the carbon-containing lithium-iron composite phosphorus oxides were produced in which the proportion of the contents of the carbon atoms were different with each other. Specifically, in the resultant carbon-containing lithium-iron composite phosphorus oxides, the proportion could be expressed by a ratio, $LiFe_{1-x}Mn_xPO_4:C_y$, in which "x"=0.15 by mol and "y"=0, 0.02, 0.05 or 0.1 by mol. In the production, $LiH_2PO_4$ was used as the lithium source as well as the phosphorus source, $FeC_2O_4·2H_2O$ was used as the iron source, $MnCO_3$ was used as the substitution element source, and carbon black was used as the carbonaceous fine particles, respectively. Note that the used carbon black had an average particle diameter of 24 nm. First of all, the $FeC_2O_4·2H_2O$ and $MnCO_3$ were mixed so that the ratio, $FeC_2O_4·2H_2O:MnCO_3$, was 0.85:0.15 by molar ratio. To the mixture of the $FeC_2O_4·2H_2O$ and $MnCO_3$, the $LiH_2PO_4$ and carbon black were added so that the ratio, Li:(Fe+Mn):C, was 1:1:0, 1:1:0.02, 1:1:0.05 or 1:1:0.1. Note that an automatic mortar was used in the mixing. Each of these mixtures were calcined in an argon gas flow at 650° C. for 6 hours. The resulting respective carbon-containing lithium-iron composite phosphorus oxides as well as carbon-free lithium-iron composite phosphorus oxide were pulverized to powdery carbon-containing lithium-iron composite phosphorus oxides as well as carbon-free lithium-iron composite phosphorus oxide which made positive electrode active materials. Note that the powdery carbon-containing lithium-iron composite phosphorus oxides as well as carbon-free lithium-iron composite phosphorus oxide had an average particle diameter of 1 μm.

Manufacture of Lithium Secondary Batteries

Lithium secondary batteries were manufactured by using the above-described carbon-containing lithium-iron composite phosphorus oxide as well as carbon-free lithium-iron composite phosphorus oxide. The positive electrodes were prepared in the following manner. First of all, 77 parts by weight of the respective carbon-containing lithium-iron composite phosphorus oxides as well as carbon-free lithium-iron composite phosphorus oxide, which made the positive electrode active materials, 15 parts by weight of the carbon black, which made the conductor, and 8 parts by weight of polyvinylidene fluoride, which made the binder, were mixed. Then, to the resultant mixtures, N-methyl-2-pyrrolidone, which made the solvent, was added in a proper amount, thereby preparing pasty positive electrode mixtures. Subsequently, the respective pasty positive electrode mixtures were coated on the opposite surfaces of a collector, which was made of an aluminum foil and had a thickness of 20 μm, respectively. Then, the pasty positive electrode mixtures were dried, and were thereafter compressed by a roller press. Thus, sheet-shaped positive electrodes were manufactured. The sheet-shaped positive electrodes were cut to a size of 54 mm×450 mm to use.

In the manufacture of the facing negative electrode, graphitized meso-carbon micro-beads (hereinafter abbreviated to "graphitized MCMB") were used. The negative electrode was manufactured in the following manner. First of all, 92 parts by weight of the graphitized MCMB, which made the negative electrode active material, and 8 parts by weight of polyvinylidene fluoride, which made the binder, were mixed. Then, to the resultant mixture, N-methyl-2-pyrrolidone, which made the solvent, was added in a proper amount, thereby preparing a pasty negative electrode mixture. Subsequently, the pasty negative electrode mixture was coated on the opposite surfaces of a collector, which was made of a copper foil and had a thickness of 10 μm. Then, the pasty negative electrode mixture was dried, and was thereafter compressed by a roller press. Thus, a sheet-shaped negative electrode was manufactured. The sheet-shaped negative electrode was cut to a size of 56 mm×500 mm to use.

A separator was held between the above-described positive electrodes and the negative electrode, respectively, and the resulting assemblies were rolled to form roll-shaped electrode assemblies. The separator had a thickness of 25 μm and a width of 58 mm, and was made from polyethylene. Then, the respective electrode assemblies were fitted into a type "18650" cylinder-shaped battery case, a non-aqueous electrolyte solution was poured thereinto. Finally, the respective battery cases were enclosed. Thus, cylinder-shaped lithium secondary batteries were manufactured. Note that the non-aqueous electrolyte solution was prepared by mixing ethylene carbonate and diethyl carbonate in a volume ratio, 3:7, and by dissolving $LiPF_6$ in a concentration of 1 M in the mixture solvent.

Assessment of Battery Characteristics (1) Measurement of Charge-and-Discharge Capacities and Calculation of Charge-and-Discharge Efficiencies On the thus manufactured lithium secondary batteries, the active material charge-and-discharge capacities were measured. The charge capacities of the respective lithium secondary batteries were measured under the temperature condition of 20° C. when the lithium secondary batteries were charged at a constant current, in which the current density was 0.2 mA/cm², up to the upper-limit charge voltage of 4.0 V. From the resultant charge capacity values, the charge capacities, which were exhibited by a unit weight of the respective positive electrode active materials from which the weight of the carbonaceous fine particles were subtracted, namely, the active material charge capacities were determined. Subsequently, the discharge capacities of the respective lithium secondary batteries were measured under the temperature condition of 20° C. when the lithium secondary batteries were discharged at a constant current, in which the current density was 0.2 mA/cm², down to the lower-limit discharge voltage of 2.6 V. From the resultant discharge capacity values, the active material discharge capacities were determined. Then, from the active material charge capacities and active material discharge capacities, which were exhibited by the respective lithium secondary batteries, the charge-and-discharge efficiencies were calculated in percentage by the following equation:

Charge-and-Discharge Efficiency (%)={(Active Material Discharge Capacity (mAh/g))/(Active Material Charge Capacity (mAh/g))}×100.

FIG. 1 illustrates the values of the active material charge capacities as well as the charge-and-discharge capacities which were exhibited by the respective lithium secondary batteries. Note that, in FIG. 1, there are illustrated the values as well, values which were exhibited by a lithium secondary battery which used a comparative lithium-iron composite phosphorus oxide as the positive electrode active material. The comparative lithium-iron composite phosphorus oxide, in which the substitution proportion by Mn was 0.1, was produced in the aforementioned manner, but was free from the composited carbonaceous fine particles.

As can be seen from FIG. 1, the more the composited proportion of the carbonaceous fine particles was, namely, the more the proportion of the carbon content was, the more the active material charge capacity enlarged. Moreover, the charge-and-discharge capacity also enlarged as the proportion of the carbon content enlarged. It is believed that these advantages are effected as follows. Since the carbonaceous fine particles are mixed in the synthesis of the lithium-iron composite phosphorus oxides, the oxidation of $Fe^{2+}$ is suppressed. Accordingly, the capacities of the lithium secondary batteries are augmented in charging in which the oxidation to $Fe^{3+}$ is essential. In addition, since the granular growth and sintering of the lithium-iron composite phosphorus oxides are inhibited, and since many conductive passes are formed by the presence of the carbonaceous fine particles, the dope and undope reactions of lithium ions are activated. Thus, it is believed that the discharge capacities of the lithium secondary batteries are increased as well and the charge-and-discharge efficiencies thereof are enhanced. Note that, when the proportion of the Fe sites, for which Mn substituted was large, both of the charge capacities and charge-and-discharge capacities enlarged, though the increments were a little. It is believed that these advantages were effected because it was possible to stabilize the crystalline structure by substituting Mn for the Fe sites. As described so far, it was verified that the lithium batteries, which used the carbon-containing lithium-iron composite phosphorus oxides according to the present invention as the positive electrode active material, exhibited great active material capacities.

(2) Charge-and-Discharge Cycle Test and Assessment of Cycle Characteristics

Subsequently, among the manufactured lithium secondary batteries, the following two lithium secondary batteries were subjected to a charge-and-discharge cycle test. Specifically, one of the lithium secondary batteries used the carbon-containing lithium-iron composite phosphorus oxide according to the present invention in which the composited proportion of the carbonaceous fine particles was 0.02 by mol.

The other one of them used the lithium-iron composite phosphorus oxide in which the carbonaceous fine particles were not composited. The charge-and-discharge cycle test was carried out in the following manner. Under the temperature condition of 60° C., the lithium secondary batteries were charged at a constant current, in which the current density was 1.0 mA/cm$^2$, up to the upper-limit charge voltage of 4.0 V. Note that the temperature, 60° C., is considered the upper limit of practical service temperature range of batteries. Subsequently, under the temperature condition of 60° C., the lithium secondary batteries were discharged at a constant current, in which the current density was 1.0 mA/cm$^2$, down to the lower-limit discharge voltage of 2.6 V. The charging and discharging were regarded as one cycle. Then, this cycle was carried out repeatedly by 500 times in total. At every cycle, the lithium secondary batteries were measured for the discharge capacity, and the active material discharge capacity was determined. FIG. 2 illustrates the variations of the active material capacities which were exhibited by the respective lithium secondary batteries in the charge-and-discharge cycle test. Note that, in FIG. 2, there are illustrated the variation of the active material discharge capacity as well, variation which was exhibited by a lithium secondary battery which used a comparative lithium-iron composite phosphorus oxide as the positive electrode active material. Similarly to the above-described measurement of the charge-and-discharge capacity and charge-and-discharge efficiency, the comparative lithium-iron composite phosphorus oxide had the proportion substitution by Mn was 0.1, and was free from the composited carbonaceous fine particles.

From FIG. 2, it is understood that the active material discharge capacities of the respective lithium secondary batteries decreased as the cycle elapsed. However, when the lithium secondary battery, which used the carbon-containing lithium-iron composite phosphorus oxide according to the present invention, is compared with the lithium secondary battery, which used the lithium-ion composite phosphorus oxide being composited with the carbonaceous fine particles, the following are apparent. For example, not only the active material discharge capacity was a higher value initially, but also the active material discharge capacity lowered less. Specifically, the lithium secondary battery, which used the carbon-containing lithium-iron composite phosphorus oxide according to the present invention, exhibited the initial active material discharge capacity of 88 mAh/g, and showed such a high capacity retention rate as 84% approximately after 500 cycles. On the other hand, the lithium secondary battery, which used the lithium-ion composite phosphorus oxide being not composited with the carbonaceous fine particles, exhibited the initial active material discharge capacity of 80 mAh/g, and showed the capacity retention rate of 77% approximately after 500 cycles. Moreover, the more the proportion of the Fe sites, for which Mn substituted was, the larger the value of the initial active material capacity was and the less the active material discharge capacity lowered. It is believed that, similarly to the above-described manner, the stabilization of the crystalline structure by substituting Mn for the Fe sites could result in the advantages.

Therefore, it was evident that the lithium secondary battery, which used the carbon-containing lithium-iron composite phosphorus oxide according to the present invention, made a lithium secondary battery, which exhibited a large active material discharge capacity, and which had such a superb cycle characteristic that the large active material discharge capacity lowered less even when it was charged and discharged cyclically at an elevated temperature.

Having now fully described the present invention, it will be apparent to one of ordinary skill in the art that many changes and modifications can be made thereto without departing from the spirit or scope of the present invention as set forth herein including the appended claims.

What is claimed is:

1. A carbon-containing lithium-iron composite phosphorus oxide for a lithium secondary battery positive electrode active material, comprising particles being composed of a lithium-iron composite phosphorus oxide having an olivine structure whose basic composition is LiFePO$_4$, and being composited with carbonaceous fine particles, wherein a molar ratio of carbon atoms in said carbonaceous fine particles with respect to lithium atoms falls in a range of from 0.02 or more to 0.2 or less, and wherein said carbonaceous fine particles have an average particle diameter of from 5 nm or more to 100 nm or less.

2. The carbon-containing lithium-iron composite phosphorous oxide for a lithium secondary battery positive electrode active material according to claim 1, wherein said carbonaceous fine particles comprise carbon black.

3. The carbon-containing lithium-iron composite phosphorous oxide for a lithium secondary battery positive electrode active material according to claim 1, wherein the carbon-containing lithium-iron composite phosphorous oxide is formed as particles having an average particle diameter of from 0.2 μm or more to 5 μm or less.

4. The carbon-containing lithium-iron composite phosphorous oxide for a lithium secondary battery positive electrode active material according to claim 1, wherein said lithium-iron composite phosphorous oxide is expressed by a composition formula, LiFe$_{1-x}$M$_x$PO$_4$, wherein "M" is at least one element selected from the group consisting of Mn, Mg, Ni, Co, Cu, Zn and Ge and a substitution proportion "x" is 0.02≦"x"≦0.2.

5. The carbon-containing lithium-iron composite phosphorous oxide for a lithium secondary battery positive electrode active material according to claim 4, wherein the element "M" in said composition formula is Mn.

6. The carbon-containing lithium-iron composite phosphorous oxide for a lithium secondary battery positive electrode active material according to claim 4, wherein the substitution proportion "x" of the element "M" in said composition formula is 0.05 ≦"x"≦0.15.

7. A process for producing a carbon-containing lithium-iron composite phosphorus oxide for a lithium secondary battery positive electrode active material, in which particles being composed of a lithium-iron composite phosphorus oxide having an olivine structure whose basic composition is LiFePO$_4$, are composited with carbonaceous fine particles, the process comprising the steps of:

mixing a lithium compound making a lithium source, an iron compound making an iron source, a phosphorus-containing ammonium salt making a phosphorus source and carbonaceous fine particles, wherein a molar ratio of carbon atoms in said carbonaceous fine particles with respect to lithium atoms falls in a range of from 0.02 or more to 0.2 or less, and wherein said carbonaceous fine particles have an average particle diameter of from 5 nm or more to 100 nm or less, thereby preparing a mixture; and calcining the mixture at a temperature of from 600° C. or more to 750° C. or less.

8. The process for producing a carbon-containing lithium-iron composite phosphorus oxide for a lithium secondary battery positive electrode active material according to claim 7, wherein $Li_2CO_3$ making said lithium source, $FeC_2O_4 \cdot 2H_2O$ making said iron source, $NH_4H_2PO_4$ making said phosphorus source and carbon black being said carbonaceous fine particles are mixed in said mixing step.

9. The process for producing a carbon-containing lithium-iron composite phosphorus oxide for a lithium secondary battery positive electrode active material according to claim 7, wherein $LiH_2PO_4$ making said lithium source as well as said phosphorus source, $FeC_2O_4 \cdot 2H_2O$ making said iron source and carbon black being said carbonaceous fine particles are mixed in said mixing step.

10. The process for producing a carbon-containing lithium-iron composite phosphorus oxide for a lithium secondary battery positive electrode active material according to claim 7, wherein the calcining temperature falls in a range of from 620° C. or more to 700° C. or less in said calcining step.

11. The process for producing a carbon-containing lithium-iron composite phosphorus oxide for a lithium secondary battery positive electrode active material according to claim 7, wherein said calcining step is carried out in an inert or in a reducing atmosphere.

12. A lithium secondary battery, comprising a positive electrode including the carbon-containing lithium-iron composite phosphorus oxide according to claim 1.

* * * * *